US012754342B2

(12) United States Patent
Utsuzawa et al.

(10) Patent No.: US 12,754,342 B2
(45) Date of Patent: Oct. 6, 2026

(54) MOTION EFFECT DETECTION

(71) Applicant: Schlumberger Technology Corporation, Sugar Land, TX (US)

(72) Inventors: Shin Utsuzawa, Sugar Land, TX (US); Nicholas Heaton, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 379 days.

(21) Appl. No.: 18/405,188

(22) Filed: Jan. 5, 2024

(65) Prior Publication Data

US 2025/0224534 A1 Jul. 10, 2025

(51) Int. Cl.
*G01V 3/32* (2006.01)
*E21B 47/13* (2012.01)

(52) U.S. Cl.
CPC ................ *G01V 3/32* (2013.01); *E21B 47/13* (2020.05)

(58) Field of Classification Search
CPC .................................. G01V 3/32; E21B 47/13
See application file for complete search history.

(56) References Cited

U.S. PATENT DOCUMENTS 11,091,997 B2 8/2021 Utsuzawa et al.
2017/0176360 A1* 6/2017 Reiderman .............. G01V 3/32
2020/0291763 A1* 9/2020 Utsuzawa ............... E21B 47/00
2021/0349232 A1* 11/2021 Peter .................... G01N 24/081
2022/0229203 A1* 7/2022 Heaton ................... E21B 21/06

OTHER PUBLICATIONS

Spin Dynamics of Carr-Purcell-Meiboom-Gill-Like Sequences in Grossly Inhomogeneous B1 and B1 Fields and Application to NMR Well Logging, Journal of Magnetic Resonance; Hurlimann et al., published Oct. 15, 1999; (Year: 1999).*
The diffusion-spin relaxation time distribution function as an experimental probe to characterize fluid mixtures in porous media; The Journal of Chemical Physics; Hurlimann et al., published Dec. 8, 2002; (Year: 2002).*
Continued—https://pubs.aip.org/aip/jcp/article/117/22/10223/294567/The-diffusion-spin-relaxation-time-distribution (Year: 2002).*
Spin Dynamics of Carr-Purcell-Meiboom-Gill-Like Sequences in Grossly Inhomogeneous B0 and B1 Fields and Application to NMR Well Logging, Journal of Magnetic Resonance; Hurlimann et al., published Oct. 15, 1999; (Year: 1999).*

(Continued)

*Primary Examiner* — Lal Ce Mang
(74) *Attorney, Agent, or Firm* — Jeffrey D. Frantz

(57) ABSTRACT

Techniques and systems for motion detection of a logging tool. A system includes a nuclear magnetic resonance (NMR) logging tool configured to perform at least one Carr-Purcell-Meiboom-Gill (CPMG) scan utilizing a plurality of distinct echo times ($t_E$) in conjunction with a single excitation pulse and a single wait time as a multiple echo spacing sequence to acquire NMR logging measurements and a processing system coupled to the NMR logging tool, wherein the processing system is configured to process the NMR logging measurements acquired by the NMR logging tool to determine whether the NMR logging measurements were affected by lateral motion of the NMR logging tool.

20 Claims, 6 Drawing Sheets

(56) References Cited

OTHER PUBLICATIONS

Continued—https://www.sciencedirect.com/science/article/pii/S1090780799919675?ref=pdf_download&fr=RR-2&rr=9e47c0af0de2aa2d (Year: 1999).*

Hürlimann, M. D. et al., "Spin Dynamics of Carr-Purcell-Meiboom-Gill-like Sequences in Grossly Inhomogenous B0 and B1 Fields and Application to NMR Well Logging" Journal of Magnetic Resonance, 2000, 143, pp. 120-135.

Hürlimann, M. D. et al. The Diffusion-Spin Relaxation Time Distribution Function as an Experimental Probe to Characterize Fluid Mixtures in Porous Media, The Journal of Chemical Physics, 2002, 117(22), pp. 10223-10232.

* cited by examiner

MOTION EFFECT DETECTION

BACKGROUND

The subject matter disclosed herein relates to systems and methods to detect motion effects generated during nuclear magnetic resonance (NMR) well logging operations.

Well logging tools are utilized to measure formation properties for formation evaluation. These logging tools can include NMR logging tools that measure induced magnetic moment of hydrogen nuclei (i.e., protons) contained within the fluid-filled pore space of formation media, which can be useful in determining the presence of, for example, hydrocarbons (e.g., oil and/or natural gas), and water.

NMR logging tools can be utilized in conjunction with various operations, including, for example, logging-while-drilling (LWD) in which formation evaluation measurements (e.g., resistivity, porosity, NMR T2 distributions, etc.) are taken during drilling operations, wireline in which measurements occur after a drilling operation is completed and the drill string is extracted from the borehole, etc. These operations can cause lateral motions that can affect NMR logging measurements. For example, NMR logging tools can measure relaxation times, e.g., transverse relaxation times ($T_2$) of formation fluids. However, if the NMR logging tool moves laterally during operation, the accuracy of the measurements can be compromised. For example, unwanted lateral motion of the NMR logging tool can result in additional signal decay, resulting in reported $T_2$ values shorter than their actual value (i.e., the value that would have been measured without motion), which causes errors in estimated formation permeability. Avoidance of these measurement inaccuracies would be beneficial.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Lateral motion effects on nuclear magnetic resonance (NMR) well logging tools (i.e., NMR tools) can induce signal decay that is difficult to distinguish from intrinsic (i.e., sample-originated) signal decay. As a result, motion-compromised NMR data can lead to faulty characterizations of formation attributes, such as porosity and formation permeability.

Accordingly, present embodiments are directed to logging tool operations in which pulse sequence that utilize multiple echo spacing ($t_E$) in a single Carr-Purcell-Meiboom-Gill (CPMG) echo train is utilized to detect motion affecting the measurements made by the NMR tool. This can include implementing a pulse sequence to detect motion of certain speed by using multiple the in a single echo train. In conjunction with this embodiment, a single-shot measurement is utilized with only one excitation pulse and no corresponding wait time between each segment.

In another embodiment, signal processing methods are applied to distinguish different types of motion effect when used with a multiple echo spacing ($t_E$) sequence. Through comparison of the signal behaviors between adjacent segments acquired with different $t_E$, the source of the motion effect, e.g., displacement and/or speed of motion, can be distinguished without knowledge of the intrinsic NMR signal that would have been measured without motion.

The techniques described herein can be implemented in conjunction with real-time motion evaluation, for example, to allow for appropriate adjustments to the drilling operations (e.g., modification to operational parameters, such as weight-on-bit (WOB), rotations per minute (RPM) or per other unit of time, torque-on-bit (TOB), etc.). Additionally and/or alternatively, the techniques described herein can be used, for example, in quality control in a post-job analysis.

Figure 1:
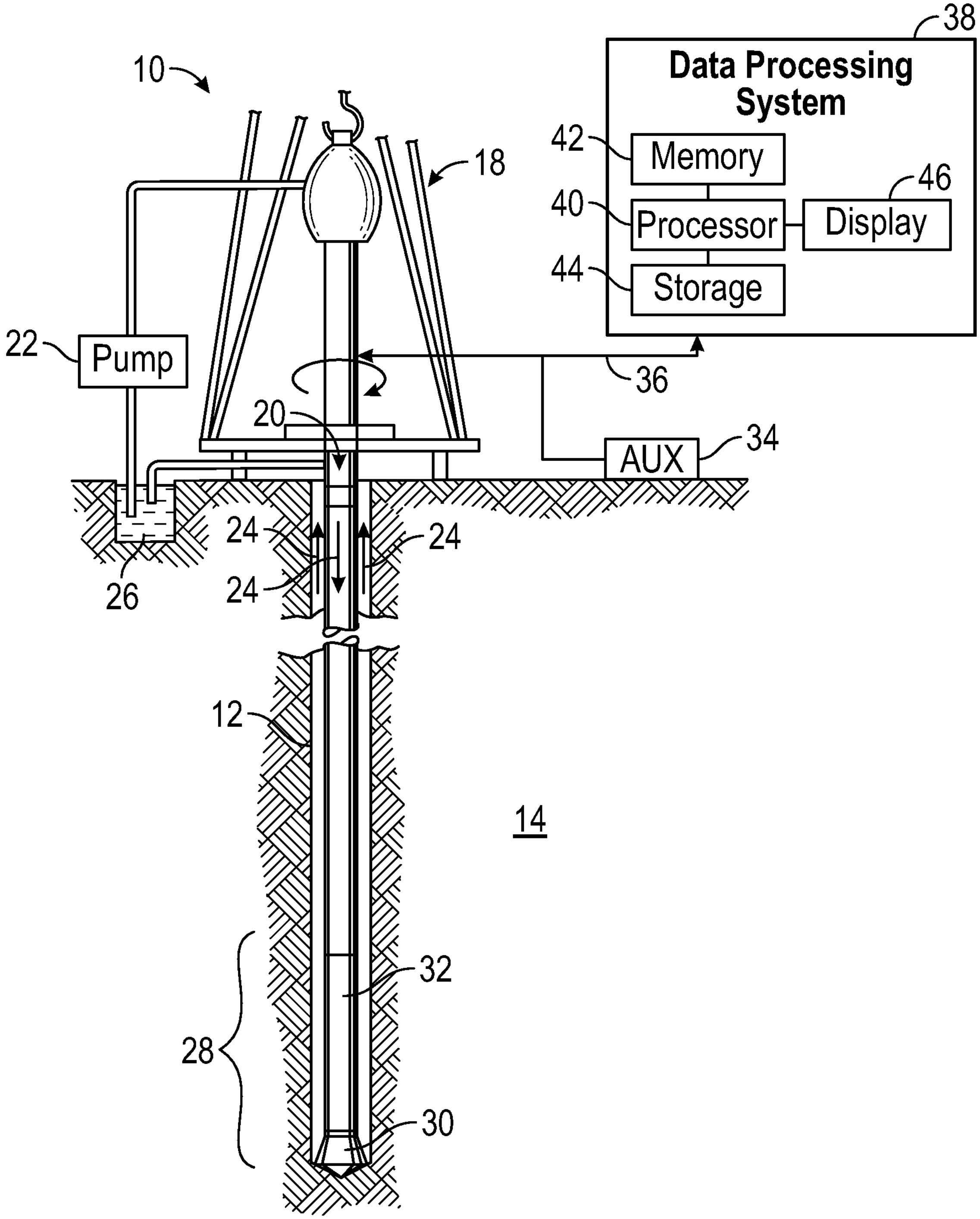
FIG. 1 depicts an example wellsite system for measuring borehole data using various downhole tools and surface tools, in accordance with embodiments of the present disclosure.

With the foregoing in mind, FIG. 1 illustrates a drilling system 10 that may employ the systems and methods of this disclosure. The drilling system 10 may be used to drill a borehole 12 into a geological region 14. In the drilling system 10, a drilling rig 18 may rotate a drill string 20 within the borehole 12. As the drill string 20 is rotated, a drilling fluid pump 22 may be used to pump drilling fluid, which may be referred to as "mud" or "drilling mud," downward through the center of the drill string 20, and back up around the drill string 20, as shown by reference arrows 24. At the surface, return drilling fluid may be filtered and conveyed back to a mud pit 26 for reuse. The drilling fluid may travel down to the bottom of the drill string 20 known as the bottom-hole assembly (BHA) 28. The drilling fluid may be used to rotate, cool, and/or lubricate a drill bit 30 that may be a part of the BHA 28. The fluid may exit the drill string 20 through the drill bit 30 and carry drill cuttings away from the bottom of the borehole 12 back to the surface.

The BHA 28 may include the drill bit 30 along with various downhole tools, such as an NMR tool 32. The BHA 28 may thus convey the NMR tool 32 through the geological region 14 via the borehole 12. The downhole tools, which may include the NMR tool 32, may collect a variety of information relating to the geological region 14 and the state of drilling in the borehole 12. For instance, the downhole tools may be logging-while drilling (LWD) tools that measure physical properties of the geological region 14, such as density, porosity, resistivity, lithology, and so forth. Likewise, the downhole tools may be measurement-while-drilling (MWD) tools that measures certain drilling parameters, such as the temperature, pressure, orientation of the drill bit 30, and so forth.

As discussed further below, the NMR tool 32 may receive energy from an electrical energy device or an electrical energy storage device, such as an auxiliary power source 34 or another electrical energy source to power the tool. In some embodiments, the NMR tool 32 may include a power source (e.g., a turbine/alternator configuration) within the NMR tool 32, such as a battery system or a capacitor to store sufficient electrical energy to emit and/or receive electromagnetic waves.

Communications 36, such as control signals, may be transmitted from a data processing system 38 to the NMR tool 32, and communications 36, such as data signals related to the results/measurements of the NMR tool 32, may be returned to the data processing system 38 from the NMR tool 32. The data processing system 38 may be any electronic data processing system that can be used to carry out the systems and methods of this disclosure. For example, the data processing system 38 may include one or more processors 40, which may execute instructions stored in memory 42 and/or storage 44. The memory 42 and/or the storage 44 of the data processing system 38 may be any suitable article of manufacture that can store the instructions. The memory 42 and/or the storage 44 may be read-only memory (ROM), random-access memory (RAM), flash memory, an optical storage medium, or a hard disk drive, to name a few examples. A display 46, which may be any suitable electronic display, may display images generated by the processor 40. The data processing system 38 may be a local component of the drilling system 10 (i.e., at the surface), within the NMR tool 32 (i.e., downhole), a device located proximate to the drilling operation, and/or a remote data processing device located away from the drilling system 10 to process downhole measurements in real time or sometime after the data has been collected. In some embodiments, the data processing system 38 may be a portable computing device (e.g., tablet, smart phone, or laptop) or a server remote from the drilling system 10. In some embodiments, the NMR tool 32 may store and process collected data in the BHA 28 or send the data to the surface for processing via communications 36 described above, including any suitable telemetry (e.g., electrical signals pulsed through the geological region 14 or mud pulse telemetry using the drilling fluid).

It should be noted that, although the discussion above relates to a drilling system, other downhole equipment or systems may employ the systems and methods of this disclosure. For example, a downhole tool with an NMR tool conveyed by slickline, coiled tubing, wireline, or other delivery systems, may utilize the disclosed systems and methods.

Figure 2:
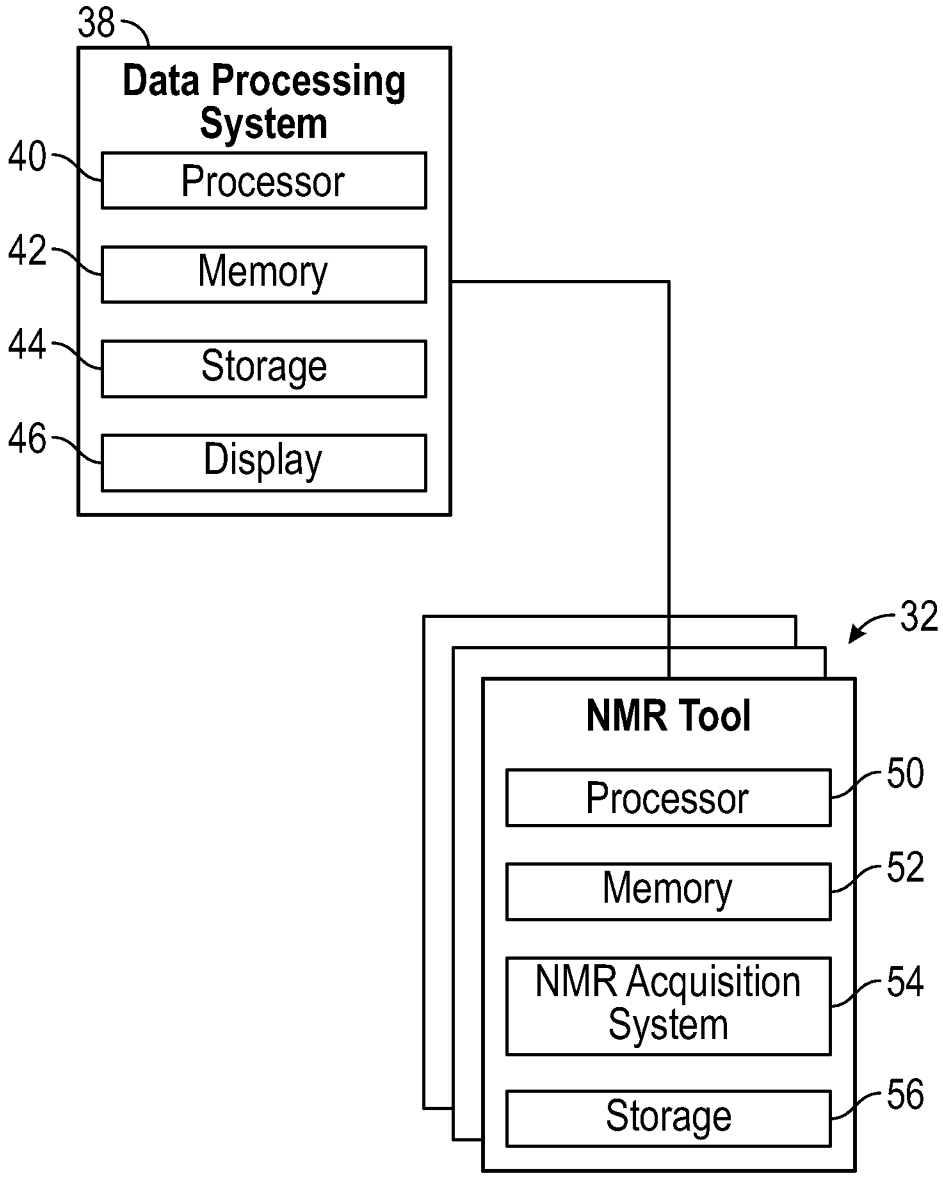
FIG. 2 depicts a well control system configured to control the wellsite system of FIG. 1, in accordance with embodiments of the present disclosure.

Operation of drilling system 10 may be controlled by a processor of the data processing system 38. For example, FIG. 2 illustrates a block diagram of the data processing system 38 that is communicatively coupled to the NMR tool 32. In the illustrated embodiment, the NMR tool 32 includes a processor 50, memory 52, an NMR acquisition system 54, and storage 56. In some embodiments, the processor 50 may be ASIC (application specific integrated circuit), field programmable gate array (FPGA), a micro control unit (MCU), a digital signal processor (DSP), and the like. In general, the drilling system 10 communicates with the data processing system 38 via a data cable, telemeter or other suitable techniques. For example, the drilling system 10 may communicate NMR measurements obtained by an NMR sensor of the drilling system 10. In turn, a processor of the surface control system may determine certain parameters (e.g., T1, T2, a porosity, a T1/T2 ratio, a water saturation, a permeability) based on the NMR measurements. In such embodiments, the NMR acquisition system 54 may include an emission source (e.g., an antenna) to acquire, obtain, or otherwise measure NMR measurements.

Figure 3:
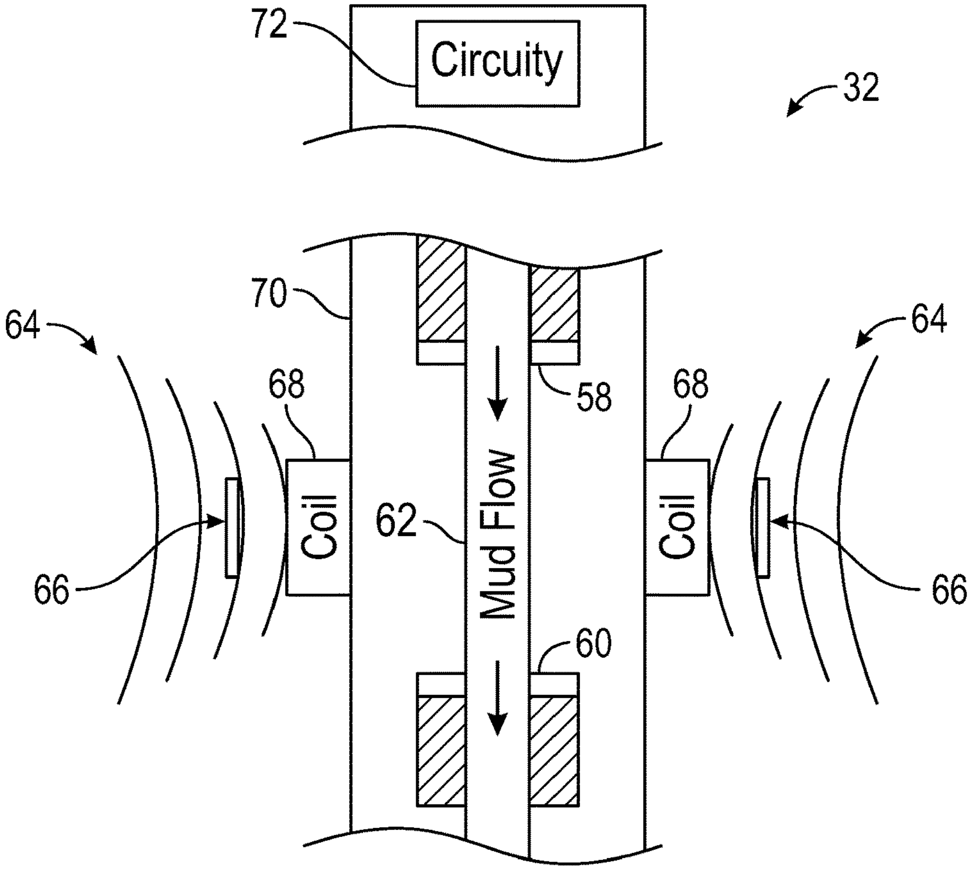
FIG. 3 depicts an example of an NMR tool as the logging tool of FIG. 1, in accordance with embodiments of the present disclosure.

FIG. 3 illustrates an example of the NMR tool 32. The NMR tool 32 as illustrated includes magnet 58 and magnet 60, which may be annular magnets disposed about a path 62 that allows for mud flow through the NMR tool 32. While magnet 58 and magnet 60 are illustrated, a single magnet or more than two magnets can be utilized in the NMR tool 32. In some embodiments, multiple magnets can operate to conduct distinct measurements in separate locations. Magnet 58 and magnet 60 produce a radial magnetic field 64 (i.e., a polarization field) with a resonant zone 66 in which nuclei in the magnetic field 64 produce an electromagnetic signal with a frequency characteristic of the magnetic field 64 at the nucleus. This generated signal can be detected by a coil 68, which may be an annular coil disposed about a housing 70 of the NMR tool 32. The coil 68 can be coupled to circuitry 72, such as one or more of the processor 50, memory 52, NMR acquisition system 54, and/or storage 56.

In operation, the NMR tool 32 can obtain measurements via an oscillating magnetic field, which may be characterized as a series of pulses from an antenna (e.g., coil 68 of FIG. 3) of the NMR tool 32. This can be followed by or interleaved with data acquisition. These pulses may be based on the Carr-Purcell-Meiboom-Gill (CPMG) pulse sequence or its variants, in which trains of spin echoes are generated by a series of pulses. The pulses cause the aligned protons to tip into a plane perpendicular (transverse) to a direction of the polarization field 64 and the tipped protons precess around the direction of the polarization field 64. This, in turn, creates an oscillating magnetic field, resulting in the transmission of radio signals where, for example, a total signal amplitude from precessing hydrogen nuclei is a measure of the total hydrogen content, or porosity, of the formation.

Transverse relaxation time ($T_2$) is indicative of the rate at which the spinning protons lose their coherence within the transverse plane. $T_2$ can represent rock pore size (e.g., a smaller pore leads to more frequent collisions and, thus, more decay). Processing of the acquired NMR signals can be performed, for example, in the processing system 38 and can include application of an inverse Laplace transformation to the acquired NMR signal to convert a multi-exponential decay curve to a $T_2$ distribution, which is provided as formation producibility indicator (i.e., a reservoir characterization).

For the NMR tool 32, the NMR measured signal originates from Hydrogen (proton) spins in a concentric shell, which can be, for example, approximately a few millimeters to ten millimeters thick. If the NMR tool 32 is moved more than a fraction of this shell thickness during a CPMG measurement (which can last, for example, for approximately 1 second, 2 seconds, or another time value), a part of the excited spins move out of the sensitivity region (e.g., the resonant zone 66) of the NMR tool 32. This leads to motion-induced signal decay.

Figure 4:
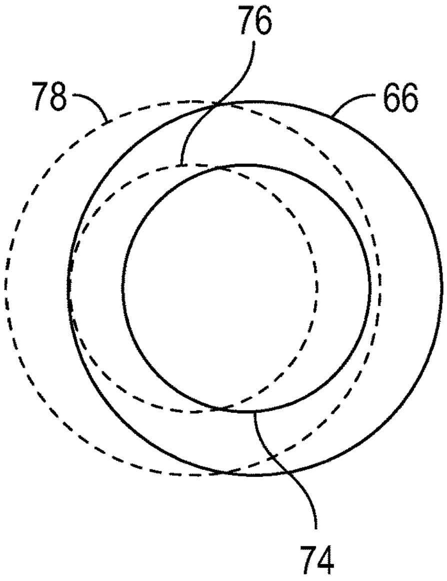
FIG. 4 depicts an example of lateral movement of the NMR tool of FIG. 3 that affects measurement of the NMR tool, in accordance with embodiments of the present disclosure.

FIG. 4 illustrates an example of the NMR tool 32 in a first position 74 and its corresponding sensitivity region (e.g., the resonant zone 66). As illustrated, if the NMR tool 32 moves laterally, for example, to a second position 76, the corresponding sensitivity region (e.g., resonant zone 78) moves in a corresponding manner. This corresponds to measurements having motion-induced signal decay as described above.

Figure 5:
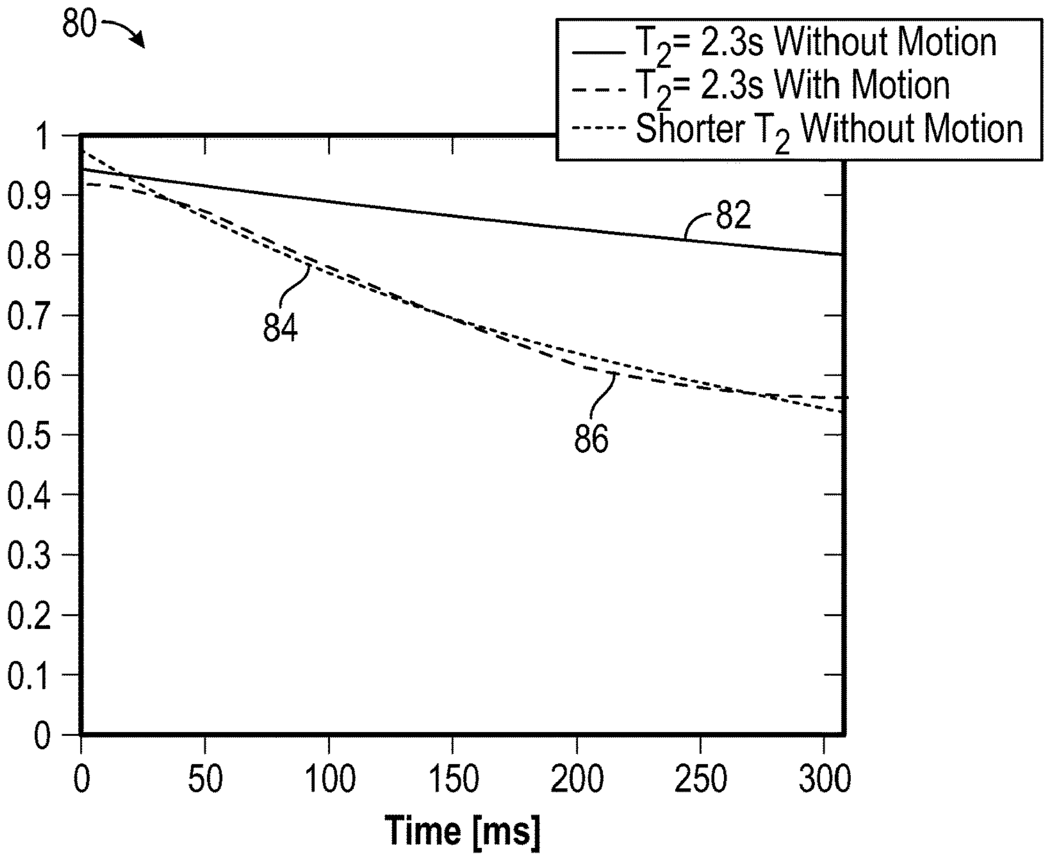
FIG. 5 illustrates a plot of NMR signals generated by the NMR tool of FIG. 3 with and without motion, in accordance with embodiments of the present disclosure.

FIG. 5 illustrates a plot 80 illustrating the difficulty in distinguishing motion-induced signal decay from intrinsic (i.e., sample-originated) signal decay. FIG. 5 illustrates a first NMR trace 82 generated without lateral motion experienced by the NMR tool 32 as well as a second NMR trace 84 (having a shorter $T_2$ than NMR trace 82) also without lateral motion experienced by the NMR tool 32. Additionally illustrated is an example of the NMR trace 86 generated with circular lateral motion experienced by the NMR tool 32. As illustrated in FIG. 5, it can be difficult to distinguish whether the NMR trace 86 is representative of the first NMR trace 82 with motion affecting NMR measurement or whether the NMR trace 86 is representative of the second NMR trace 84 without motion affecting NMR measurement. Indeed, FIG. 5 illustrates that it is difficult to distinguish an NMR signal with a long relaxation time affected by motion (NMR trace 86) and that with shorter relaxation time not affected by motion (NMR trace 84). Techniques described herein operate to distinguish NMR signals that are generated with motion from those generated without motion, hence allow for detecting the presence of motion.

Figure 6:
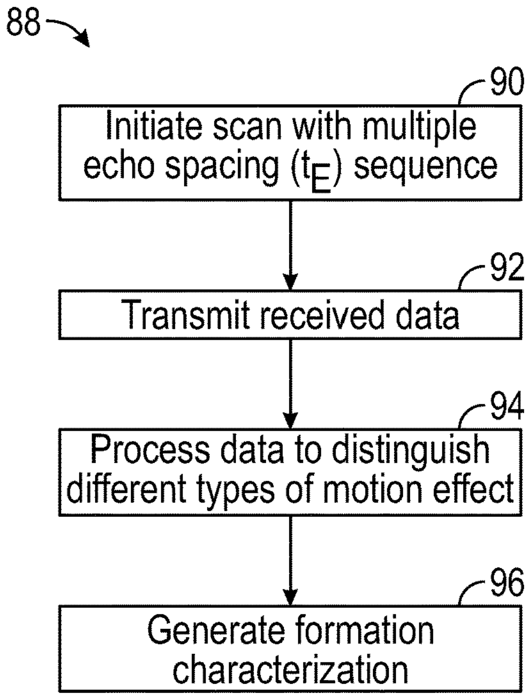
FIG. 6 depicts a flow chart describing a first technique for operation of the NMR tool of FIG. 3 as well as signal processing techniques to distinguish different types of motion effect when used with a multiple echo spacing ($t_E$) sequence, in accordance with embodiments of the present disclosure.

FIG. 6 depicts a flow chart 88 describing a first technique to determine motion impacts to data measured by the NMR tool 32. It should be noted that one or more of the blocks of flow chart 88 may be performed by the processing system 38. Additionally, one or more of the blocks of flow chart 88 can be performed by the computing system 62. For example, in one or more embodiments, processor(s) 46 can operate in conjunction with a deep-learning processor or a neural-network processor and/or, for example, the one or more processor(s) 46 may include machine learning and/or artificial intelligence (AI) based processors. Similarly, the computing system 62 may include one or more processors that can operate in conjunction with a deep-learning processor or a neural-network processor and/or, for example, the one or more processors of the computing system 62 may include machine learning and/or artificial intelligence (AI) based processors. Furthermore, the one or more neural networks can be software-implemented or hardware-implemented in either the processing system 38 or the computing system 62.

The flow chart 88 describes a technique for operation of the NMR tool 32 as well as signal processing techniques to distinguish different types of motion effect when used with a multiple echo spacing ($t_E$) sequence. This relies on the fact that, when multi-$t_E$ sequence is run in the presence of motion, NMR signal behaves differently from that without motion. By comparing the signal behaviors between adjacent segments acquired with different $t_E$, the source of any motion effect, displacement and/or speed of motion, can be distinguished without knowing the intrinsic NMR signal that would be measured without motion.

In block 90, a CPMG measurement is initiated by the NMR tool 32. Each CPMG can consist of, for example, tens to thousands of pulses applied with time intervals (e.g., (E) and NMR echoes measured in between. In present embodiment, the NMR tool 32 generates measurements with multiple the values in one CPMG. This will allow for rapid and consistent motion evaluation since if there is motion, each segment shows different decay depending on the $t_E$ used in each segment and the amplitude and the speed of motion. However, if there is no motion (e.g., lateral motion) experienced by the NMR tool, each segment with different the will result in the same decay as that would be measured without motion, with an inherent amplitude drop that is dictated by NMR physics (and hence predictable/correctible).

Thus, unlike traditional NMR tool operation, block 90 includes the NMR tool 32 performing measurements with multiple $t_E$ within a single CPMG, with only one excitation pulse and without the typical wait time between each segment. Because multiple CPMG measurements is a costly operation due to wait times (e.g., in the order of seconds) between each CPMG to allow hydrogen spins to repolarize, the NMR tool 32 operates by generating pulse sequence that use multiple the values within one CPMG. A single CPMG is a pulse sequence that starts from a nominal 90-degree pulse (e.g., an excitation pulse, to rotate spins from the direction parallel to the magnetic field (Bo) experienced by a nucleus to the transverse plane), followed by a series of nominal 180-degree pulses (e.g., refocusing pulses, to flip spins within the transverse plane to refocus dephasing spins), which are substantially different from the excitation pulse (usually longer than the excitation pulse).

The scan performed by the NMR tool 32 in block 90 results in the transmission of radio signals where, for example, a total signal amplitude from precessing hydrogen nuclei is a measure of the total hydrogen content, or porosity, of the formation (as noted above). These signals are received by the NMR tool 32 and, in block 92, the signals (or indications thereof) are transmitted as data to, for example, the processing system 38 for processing in conjunction with block 94. This processing in block 94 can operate to distinguish different types of motion effect when utilized with the multiple echo spacing ($t_E$) sequence, as described in greater detail below, for use in generating a formation characterization in block 96.

Figure 7:
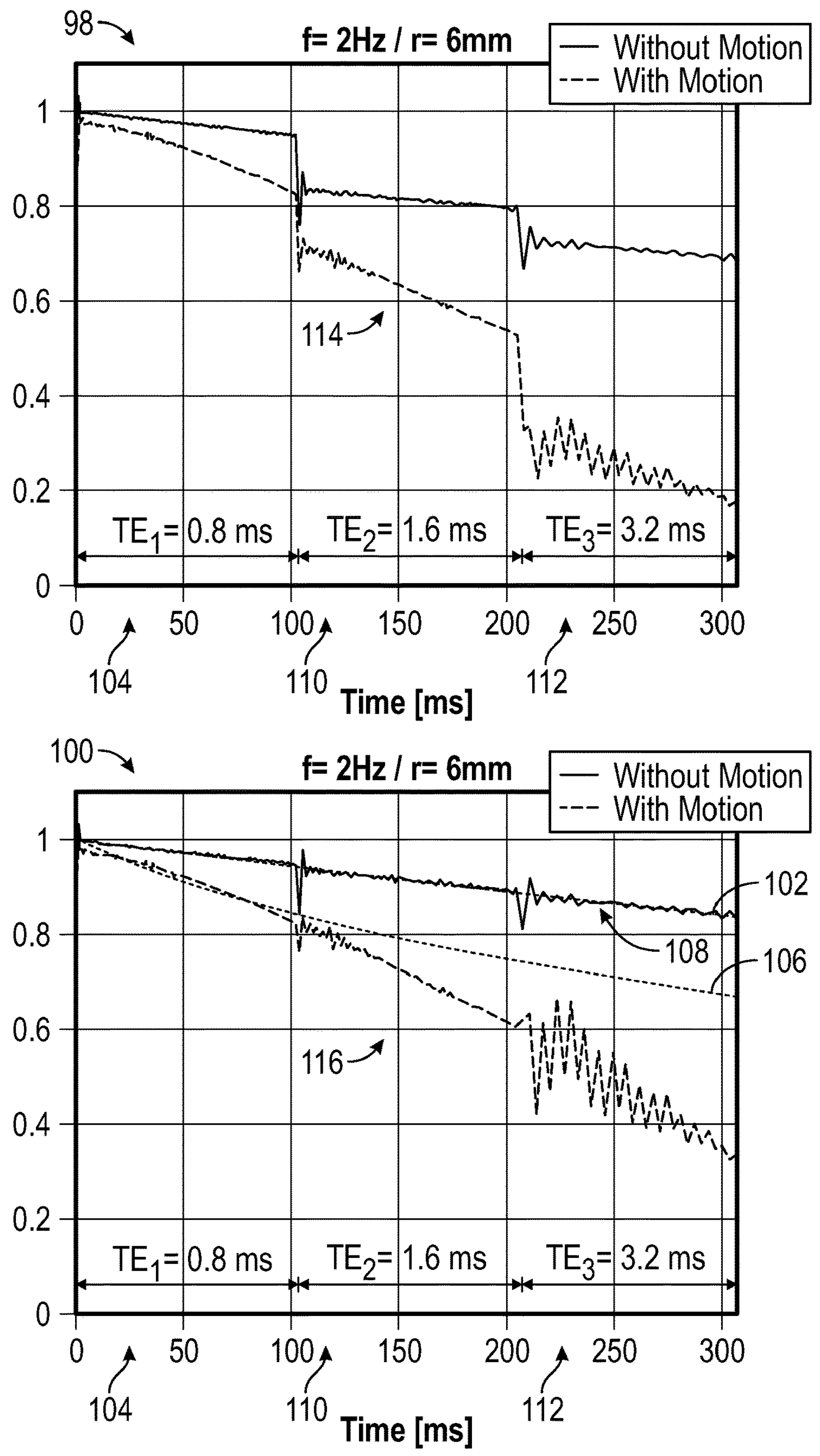
FIG. 7 depicts a plot of an NMR signal obtained in conjunction with the first technique of FIG. 6 with the NMR tool of FIG. 3 and a plot of the same signal with normalized amplitude, in accordance with embodiments of the present disclosure.

FIG. 7 depicts a plot 98 of an NMR signal obtained by, for example, the data processing system 38 as transmitted from the NMR tool 32 in block 92. Plot 98 represents data generated from implementing an NMR pulse sequence that uses multiple the values within one CPMG. The same data in plot 98 is illustrated in plot 100, with each segment being normalized to follow the previous segment. The techniques applied herein include computation of either dashed line 102 or dashed line 106 by applying either multi-exponential inversion or multi-"stretched-exponential" inversion to the first segment 104 of solid line 108 (representing data without motion) or the first segment 104 of solid line 116 (representing data with motion), without knowing if they are affected by motion or not. These inversions are intended to be examples of types of NMR inversions that can be applied and other types of inversions, for example, a maximum entropy inversion can instead be applied. If there is no motion, measured data from the second segment 110 and the third segment 112 will follow the dashed line, as seen in the agreement between solid line 108 and dashed line 102. Therefore, dashed line 102 is the decay with true $T_2$ that would be measured without motion, and thus equivalent to a result that would be obtained in a single-$t_E$ measurement without motion. If there is motion, on the other hand, measured data in the second and the following segments will deviate from the dashed line, as seen in solid line 116 relative to dashed line 106.

Net displacement of spins (i.e., macroscopic motion rather than diffusion) in inhomogeneous magnetic fields cause signal attenuation during a measurement. Such signal attenuation, i.e., motion-induced signal loss, can be classified into two categories (which are not mutually exclusive and can occur simultaneously). The first category is displacement-dependent signal loss, and the second category is velocity-dependent signal loss.

Displacement-dependent signal loss is due to the excited spins moving out of the finite sensitive volume. The shape of this volumetric signal loss can be computed from the distribution of magnetic fields and the direction of motion (e.g., lateral, axial) and well characterized by a single function $f(v, n, t_E)$. It should be noted that the single function $f$ can take any form. For example, in some cases, $f$ may be approximated by a stretched exponential function:

$$f(v, n, t_E) = \exp\left(-\frac{(v \cdot n \cdot t_E)^a}{b}\right) \quad \text{(Equation 1)}$$

In Equation 1, a and b are the tool-dependent constants. Equation 1 is equivalent to a Gaussian function when a=2. With this, the observed signal may be described as:

$$S = M_z f(v, n, t_E)\exp\left(-\frac{n \cdot t_E}{T_2}\right) = M_z \exp\left(-\frac{(v \cdot n \cdot t_E)^a}{b}\right)\exp\left(-\frac{n \cdot t_E}{T_2}\right) \quad \text{(Equation 2)}$$

In Equation 2, $M_z$ is the magnetization's z-component at the beginning of the CPMG and can be approximated by:

$$M_z(t_W) = M_0\left\{1 - \exp\left(-\frac{t_W}{T_1}\right)\right\} \quad \text{(Equation 3)}$$

In Equation 3, Mo is the magnetization at the thermal equilibrium.

Since Equation 2 include the motion effect, data fit based on Equation 2 may be called motion-aware inversion. With motion-aware inversion, we can obtain an estimate of the amount of displacement, hence the speed of motion (by knowing the duration of displacement, from pulse sequence parameters) based on the amount of signal loss.

Velocity-dependent signal loss is due to the imperfect spin refocusing caused by phase shifts. In CPMG measurements, a series of refocusing pulses is applied, so that inverted spins repeatedly pass through the points of maximum coherence to yield echoes. Shift of spin phases during this process causes the rotation of the effective rotation axis around z-axis. This is analogous to applying pulses with non-optimal phases, which results in the loss of phase coherence, hence NMR signal amplitude. Such phase shift occurs when spins are moving in an inhomogeneous magnetic field. Assuming a spin that is moving at a constant velocity v in a magnetic field with a linear gradient g, the extra phase shift acquired by the spin at the time of the first echo $t=t_E$ is given by $$\varphi = \frac{\gamma g v t_E^2}{4}. \quad \text{(Equation 4)}$$

Here, $\gamma$ is the gyromagnetic ratio, which is unique to each nuclei (e.g., $\gamma=2\pi\cdot4258$ rad/s/G for $^1$H (proton) measured in NMR well logging), g is a gradient of the slope magnetic field along the direction of motion, v is the speed of motion, $t_E$ is echo time, i.e., the time interval between excitation and echo formation, and $\varphi$ is an amount of phase shift. A following refocusing pulse acts like a rotation around an axis that is shifted from the intended axis by $\varphi/2$. Magnetizations parallel to this effective rotation axis behave in the same way as in CPMG measurement and preserve their amplitude from echo to echo. On the other hand, the component perpendicular to this effective rotation axis behaves as in Carr-Purcell (CP) measurement (i.e., without the modification introduced by Meiboom and Gill) and leads to odd-even echo oscillations with faster overall decay (especially when pulse moment is not optimal). Therefore, the presence of odd-even echo oscillations is an indication of motion in an inhomogeneous magnetic field.

From Equations 2 and 4, the severity of the motion effect on CPMG measurement depends on $t_E$. Therefore, longer $t_E$ provides more sensitivity to smaller motion. Thus, by including different the values when operating the NMR tool 32 (e.g., the ones corresponding to a respective segment 104, segment 110, and segment 112), the processing in block 94 allows for determination of the severity of motion affecting the CPMG measurement. And using different $t_E$ values in a single CPMG measurement minimize the total execution time to detect motion of different severities.

As illustrated in each of plot 98 and plot 100, there are three the values used in a single CPMG pulse sequence, corresponding to a first segment 104, a second segment 110, and a third segment 112. However, more than three the values (e.g., four or five) can be applied or less than three the values (e.g., two) can be applied. Also, the order of $t_E$ is arbitrary; in plots 98 and 100, the sequence started from the shortest $t_E$ and ended at the longest $t_E$, but it can be in any order (e.g., longest-medium-shortest, longest-shortest-medium, etc.). The detection of motion relies on the deviation of solid line 116 from dashed line 106 (i.e., fit result of the first segment 104) in the second segment 110 and the third segment 112, without knowing the underlying true signal decay that would be measured without motion (i.e., solid line 108).

Returning to block 94 of FIG. 6, having different segments (e.g., segment 104, segment 110, and segment 112) with different $t_E$ values does result in inherent amplitude drops at the boundary of each segment (i.e., the timing that $t_E$ changes). This is dictated by NMR physics and hence predictable/correctible. Thus, as previously noted, in block 94, the drops of the CPMG signal amplitude can be normalized to follow the previous segment.

However, in some embodiments, this normalization need not be performed in conjunction with block 94. Instead, as illustrated in plot 98 of FIG. 7, data 114 can be analyzed for oscillations present in each segment. For example, as illustrated in the third segment 112, oscillations present in the data 114 that, for example, exceed a predetermined amplitude can be processed in block 94 as corresponding to movement of the NMR tool 32. In this manner, the raw measured data from the NMR tool 32 can be used to detect motion without normalization to compensate for amplitude drops as the $t_E$ changes during a CPMG scan.

Figure 8:
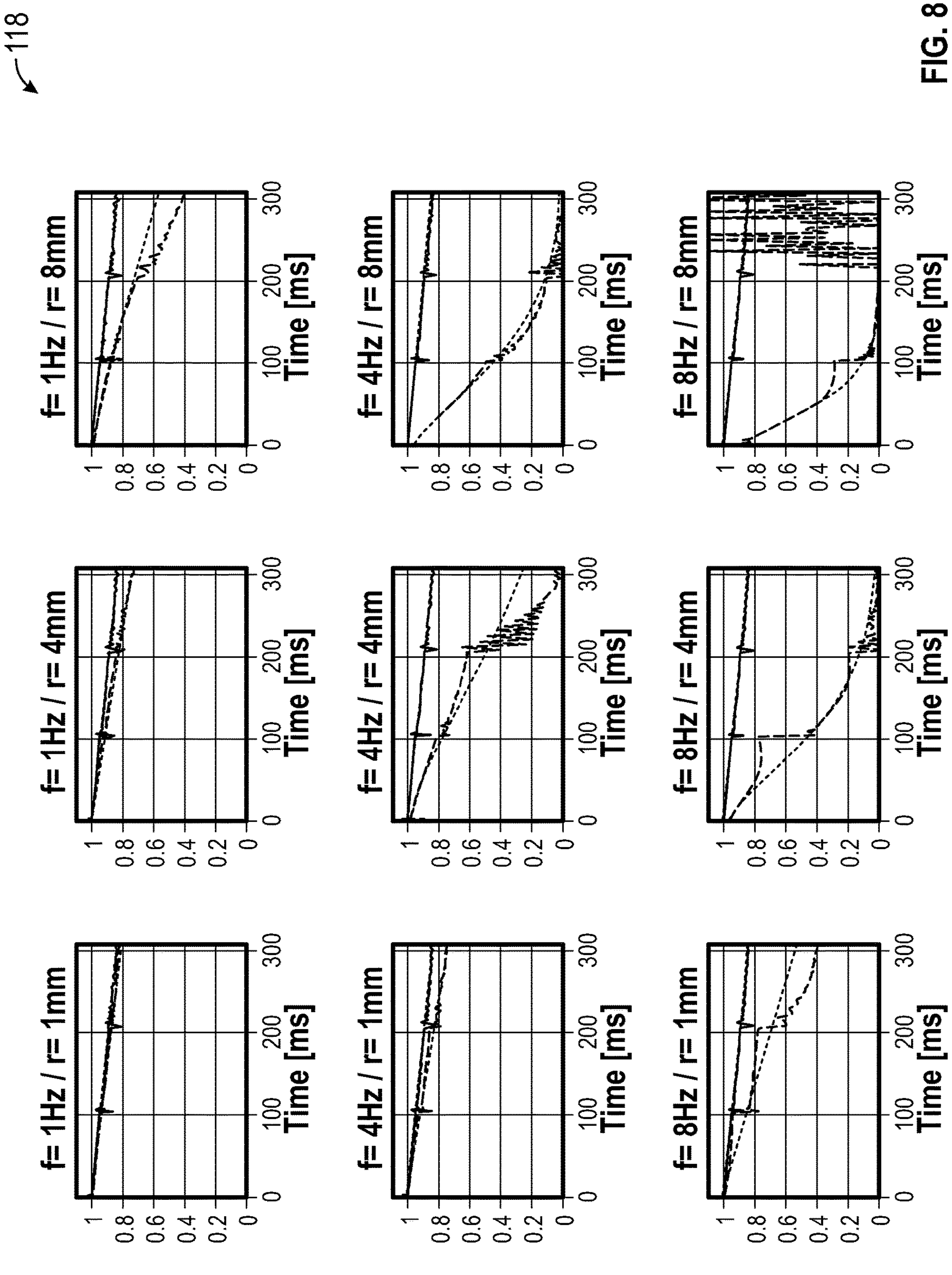
FIG. 8 depicts a series of plots of NMR signals obtained with different combinations of frequency and a radius of circular motion, in accordance with embodiments of the present disclosure.

FIG. 8 illustrates a set of plots 118 as examples obtained with different combinations of the frequency ($f$) and the radius (r) of circular motion for a given NMR tool 32. In each panel, the upper solid line represents the NMR data measured without motion, while the lower solid line is the NMR data measured with motion of specified motion properties. Associated dashed lines are the results of stretched-exponential inversion applied to the first segment of corresponding NMR data. The $t_E$ values used in each segment are the same as those in FIG. 7.

The NMR signal is affected by the displacement and the speed of motion. In the present example, amplitude (2r) corresponds to the maximum displacement, and $v=2\pi f r$ is the speed of motion for circular motion used in these examples. The set of plots shows aspects of multi-$t_E$ sequence to assess the displacement and the speed of motion, hence the impact of motion on the NMR measurement. For example, at (1 Hz, 1 mm), the decay of segments 2 and 3 agree with the dashed line (which is the result of inversion applied to segment 1). Therefore, we can expect good NMR answer products even when the intrinsic signal decay that would be measured without motion is unknown.

When motion is fast but relatively small, such as at (8 Hz, 1 mm) or (4 Hz, 2 mm), the speed-dependent effect is dominant, and the signal decay under given motion is determined by the phase shift, which increases as $t_E^2$ according to Equation 4. This results in minimal deviation from the segment 1 trend (i.e., the dashed line, which is the result of inversion applied to segment 1) when $t_E$ is small, but an abrupt increase when it reached critical speed, potentially with echo oscillations.

When motion is slow but the displacement becomes non-negligible, such as at (1 Hz, 4 mm), the displacement-dependent decay is dominant, and the signal decay under given motion is well characterized by a stretched exponential curve (Equation 1). Faster motion (e.g., (1 Hz, 8 mm) adds contributions from the speed-dependent decay at larger $t_E$, resulting in faster decay in later segments. The most severe motion (e.g., (4 Hz, 8 mm) and (8 Hz, 4 mm)) introduces large echo oscillations in segment 3.

As illustrated in the plots at (1 Hz, 8 mm) or (8 Hz, 1 mm) of FIG. 8, the benefit of stretched-exponential-based motion-aware inversion over standard exponential-based inversion is apparent. When displacement-dependent motion effect is dominant (segments 1 and 2 at (1 Hz, 8 mm)), the signal follows the same displacement-dependent curve shown in a dashed line, which was obtained by inverting segment 1 with the motion-aware inversion kernel (Equation 2). When speed-dependent motion effect starts to take place (segment 3 at (1 Hz, 8 mm)), the signal deviates from the displacement-dependent curve. On the other hand, when speed-dependent motion effect is dominant (8 Hz, 1 mm), the fit using the displacement-dependent curve is not successful even in segment 1 and the signal in segment 2 can deviate upward (i.e., shows less decay) when speed-dependent motion effect is relatively small thanks to short $t_E$. That becomes not the case in segment 3 as $t_E$ is increased. As such, distinguishing of displacement-dependent motion effect and speed-dependent motion effect can be accomplished by using two types of inversion kernels (i.e., standard exponential and stretched exponential) in processing multi-$t_E$ data.

Each of the techniques described above can be carried out as part of block 94 of FIG. 6. When the data is identified as being generated while the NMR tool 32 is experiencing motion, the severity of the motion can be compared against a predetermined threshold value. If the severity of the motion is above a predetermined threshold value, the motion-affected data can be discarded. If, however, the severity of the motion is below the threshold value, it can be determined that the motion (while adding additional error and/or uncertainty) did not corrupt the data and, accordingly, the data can be utilized in formation evaluation. If the data is above the threshold value, the processing system can be initially set up to either use or disregard the data (e.g., based on a predetermined setting, user preferences, etc.).

For example, in one embodiment, the difference between measurement and the fit of the first segment measurement is utilized and either the mean or maximum of such difference (a scalar) is compared with a predetermined threshold. In another embodiment, the speed and/or displacement of motion is estimated from either (1) the difference between measurement and fit as mentioned above, (2) shape of the decay obtained by stretched-exponential fitting, and/or (3) the oscillation in long-$t_E$ segment (i.e., for speed) and compared that with corresponding thresholds of speed/displacement. Additionally, inputs (1)-(3) are not exclusive with each other (i.e., one or more can be combined).

One technique utilized in the determination of the usability of motion-affected data is described below. As disclosed in U.S. Pat. No. 11,091,997, motion speed and displacement can be used to estimate the NMR measurement quality. The critical speed v beyond which NMR measurement would be compromised can be determined from tool design parameters, such as magnetic field gradient g and echo time the according to Equation 4. For example, for a given NMR tool 32 operated with $t_E$=0.8 ms, v=16 and 95 mm/s can be considered critical speed. If estimated v is lower than 16 mm/s (i.e., the v is below a threshold value), NMR porosity measurement will be usable. If estimated v is greater than 95 mm/s (i.e., the v is above a threshold value), NMR porosity measurement will be unusable. If estimated v is in between each of these threshold values, porosity measurement quality depends on the displacement of motion (i.e., it can be used in formation evaluation based on the expected amount of corruption of the data).

Any data that was determined to either be not influenced by motion or determined to be included based on its comparison with a threshold value (as described above) is utilized in generating a formation characterization in block 96. Block 96 can include application of an inverse Laplace transformation to the processed NMR signals from block 94 to convert a multi-exponential decay curve to a $T_2$ distribution, which is provided as formation producibility indicator (i.e., a reservoir characterization). In another embodiment, the motion-measurement data obtained with the multiple echo spacing sequence can be combined with regular measurement data and an inverse Laplace transform is applied to both of them to get reservoir characteristics in block 96. Additionally, and or alternatively, this information can be provided to, for example, the processing system 38 and/or the computing system for use in subsequent quality control.

The above discussion is applicable whenever there are net relative displacements between spins and the magnetic field, i.e., the same effect is observable when the spins are stationary while the NMR tool 32 is moving, as is the case in downhole NMR well logging, or vice versa. Since drilling operation can induce significant lateral tool motion depending on BHA configurations and drilling parameters, compromised NMR measurement due to lateral motion is a risk in LWD-NMR operations.

The subject matter described in detail above may be defined by one or more clauses, as set forth below.

A system includes a nuclear magnetic resonance (NMR) logging tool configured to perform at least one Carr-Purcell-Meiboom-Gill (CPMG) scan utilizing a plurality of distinct echo times ($t_E$) in conjunction with a single excitation pulse and a single wait time as a multiple echo spacing sequence to acquire NMR logging measurements; and a processing system coupled to the NMR logging tool, wherein the processing system is configured to process the NMR logging measurements acquired by the NMR logging tool to determine whether the NMR logging measurements were affected by lateral motion of the NMR logging tool.

The system of the preceding clause, wherein the NMR logging tool is configured to utilize a sequence with two $t_E$ as the multiple echo spacing sequence or with three or more $t_E$ as the multiple echo spacing sequence.

The system of any preceding clause, wherein the processing system is further configured to determine whether an oscillation amplitude of at least a portion of the NMR logging measurements acquired with the multiple echo spacing sequence exceeds a predetermined value as an indication that the NMR logging measurements were affected by lateral motion of the NMR logging tool.

The system of any preceding clause, wherein the processing system is further configured to compare normalized NMR logging measurements acquired with the multiple echo spacing sequence with a result of an inversion with multi-exponential kernel functions applied to the normalized NMR logging measurements and use the difference as an indication that the NMR logging measurements were affected by lateral motion of the NMR logging tool.

The system of any preceding clause, wherein the processing system is further configured to compare normalized NMR logging measurements acquired with the multiple echo spacing sequence with a result of an inversion with multi-stretched-exponential kernel functions or any other kernel functions applied to the normalized NMR logging measurements and use the difference as an indication that the NMR logging measurements were affected by lateral motion of the NMR logging tool.

The system of any preceding clause, wherein the processing system is further configured to compare normalized NMR logging measurements acquired with the multiple echo spacing sequence or a result of an inversion with multi-stretched-exponential kernel functions, multi-exponential kernel functions, or any other kernel functions applied to the normalized NMR logging measurements acquired with the multiple echo spacing sequence with that from normalized NMR logging measurements acquired with a single echo spacing sequence and use the difference as an indication that the NMR logging measurements were affected by lateral motion of the NMR logging tool.

A method comprising performing at least one Carr-Purcell-Meiboom-Gill (CPMG) scan utilizing a plurality of distinct echo times ($t_E$) in conjunction with a single excitation pulse and a single wait time as a multiple echo spacing sequence to acquire NMR logging measurements and processing the NMR logging measurements to determine whether the NMR logging measurements were affected by lateral motion of the NMR logging tool.

The method of the preceding clause, further comprising utilizing a sequence with two $t_E$ as the multiple echo spacing sequence or with three or more the as the multiple echo spacing sequence.

The method of any of the preceding clauses, further comprising determining whether an oscillation amplitude of at least a portion of the NMR logging measurements acquired with the multiple echo spacing sequence exceeds a predetermined value as an indication that the NMR logging measurements were affected by lateral motion of the NMR logging tool.

The method of any of the preceding clauses, further comprising comparing normalized NMR logging measurements acquired with the multiple echo spacing sequence with a result of an inversion with multi-exponential kernel functions applied to the normalized NMR logging measurements and use the difference as an indication that the NMR logging measurements were affected by lateral motion of the NMR logging tool.

The method of any of the preceding clauses, further comprising comparing the normalized NMR logging measurements acquired with the multiple echo spacing sequence with a result of an inversion with multi-stretched-exponential kernel functions or any other kernel functions applied to the normalized NMR logging measurements and use the difference as an indication that the NMR logging measurements were affected by lateral motion of the NMR logging tool.

The method of any of the preceding clauses, further comprising comparing normalized NMR logging measurements acquired with the multiple echo spacing sequence or a result of an inversion with multi-stretched-exponential kernel functions, multi-exponential kernel functions, or any other kernel functions applied to the normalized NMR logging measurements acquired with the multiple echo spacing sequence with that from normalized NMR logging measurements acquired with a single echo spacing sequence and use the difference as an indication that the NMR logging measurements were affected by lateral motion of the NMR logging tool.

The method of any of the preceding clauses, further comprising determining whether to utilize the NMR logging measurements in generation of estimations of formation attributes when a processing system determines that the NMR logging measurements were affected by lateral motion of the NMR logging tool.

A tangible and non-transitory machine readable medium comprising instructions to cause a processing system to perform at least one Carr-Purcell-Meiboom-Gill (CPMG) scan utilizing a plurality of distinct echo times ($t_E$) in conjunction with a single excitation pulse and a single wait time as a multiple echo spacing sequence to acquire NMR logging measurements and process the NMR logging measurements to determine whether the NMR logging measurements were affected by lateral motion of the NMR logging tool.

The tangible and non-transitory machine readable medium of the preceding clause, wherein the instructions further cause the processing system to utilize a sequence with two the as the multiple echo spacing sequence or utilize a sequence with three or more $t_E$ as the multiple echo spacing sequence.

The tangible and non-transitory machine readable medium of any preceding clause, wherein the instructions further cause the processing system to determine whether an oscillation amplitude of at least a portion of the NMR logging measurements acquired with the multiple echo spacing sequence exceeds a predetermined value as an indication that the NMR logging measurements were affected by lateral motion of the NMR logging tool.

The tangible and non-transitory machine readable medium of any preceding clause, wherein the instructions further cause the processing system to comparing normalized NMR logging measurements acquired with the multiple echo spacing sequence with a result of an inversion with multi-exponential kernel functions applied to the normalized NMR logging measurements and use the difference as an indication that the NMR logging measurements were affected by lateral motion of the NMR logging tool.

The tangible and non-transitory machine readable medium of any preceding clause, wherein the instructions further cause the processing system to compare the normalized NMR logging measurements acquired with the multiple echo spacing sequence with a result of an inversion with multi-stretched-exponential kernel functions or any other kernel functions applied to the normalized NMR logging measurements and use the difference as an indication that the NMR logging measurements were affected by lateral motion of the NMR logging tool.

The tangible and non-transitory machine readable medium of any preceding clause, wherein the instructions further cause the processing system to compare normalized NMR logging measurements acquired with the multiple echo spacing sequence or a result of an inversion with multi-stretched-exponential kernel functions, multi-exponential kernel functions, or any other kernel functions applied to the normalized NMR logging measurements acquired with the multiple echo spacing sequence with that from normalized NMR logging measurements acquired with a single echo spacing sequence and use the difference as an indication that the NMR logging measurements were affected by lateral motion of the NMR logging tool.

The tangible and non-transitory machine readable medium of any preceding clause, wherein the instructions further cause the processing system to determine whether to utilize the NMR logging measurements in generation of estimations of formation attributes, when the processing system determines that the NMR logging measurements were affected by lateral motion of the NMR logging tool.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

a drill string disposed in a borehole formed in a subsurface geological region;

a downhole assembly coupled to the drill string and comprising a nuclear magnetic resonance (NMR) logging tool; and a processing system coupled to the NMR logging tool and comprising a control unit, wherein the control unit is configured to;

cause the NMR logging tool to perform at least one Carr-Purcell-Meiboom-Gill (CPMG) scan, the performing including generating a sequence of CPMG pulses, wherein:

each pulse of the sequence of CPMG pulses is separated from an adjacent pulse of the sequence of CPMG pulses by a wait time;

a single pulse of the sequence of CPMG pulses comprises a single echo train; and the single echo train comprises distinct echo times ($t_E$), the distinct echo times ($t_E$) comprising a first echo time ($t_{E1}$) temporally adjacent to a second echo time ($t_{E2}$) different than the first echo time ($t_{E1}$) and within the single echo train;

acquire NMR logging measurements from the generating the sequence of CPMG pulses having the distinct echo times ($t_E$);

process the NMR logging measurements acquired by the NMR logging tool to determine the NMR logging measurements were affected by lateral motion of the NMR logging tool; and in response to a determination that the NMR logging measurements were affected by the lateral motion of the NMR logging tool, modify an operational parameter of the downhole assembly to account for the lateral motion in order to:

improve an accuracy of a determining at least one of a porosity or a total hydrogen content of the subsurface geological region; and drill the borehole via the downhole assembly based on the determining the at least one of the porosity or the total hydrogen content of the subsurface geological region.

2. The system of claim 1, wherein the processing system is further configured to determine whether an oscillation amplitude of at least a portion of the NMR logging measurements acquired with the distinct echo times ($t_E$) exceeds a predetermined value as an indication that the NMR logging measurements were affected by the lateral motion of the NMR logging tool.

3. The system of claim 1, wherein the processing system is further configured to determine a difference between normalized NMR logging measurements acquired with the distinct echo times ($T_E$) and a result of an inversion with multi-exponential kernel functions applied to the normalized NMR logging measurements and use the difference as an indication that the NMR logging measurements were affected by the lateral motion of the NMR logging tool.

4. The system of claim 1, wherein the processing system is further configured to determine a difference between normalized NMR logging measurements acquired with the distinct echo times ($t_E$) and a result of an inversion with multi-stretched-exponential kernel functions or any other kernel functions applied to the normalized NMR logging measurements and use the difference as an indication that the NMR logging measurements were affected by the lateral motion of the NMR logging tool.

5. The system of claim 1, wherein the processing system is further configured to determine a difference between normalized NMR logging measurements acquired with the distinct echo times ($t_E$) or a result of an inversion with multi-stretched-exponential kernel functions, multi-exponential kernel functions, or any other kernel functions applied to the normalized NMR logging measurements acquired with the distinct echo times ($t_E$) and normalized NMR logging measurements acquired with a single echo spacing sequence-time and use the difference as an indication that the NMR logging measurements were affected by the lateral motion of the NMR logging tool.

6. The system of claim 1, wherein the wait time is a single wait time.

7. A method comprising:

performing at least one Carr-Purcell-Meiboom-Gill (CPMG) scan, the performing including generating a sequence of CPMG pulses, wherein:

each pulse of the sequence of CPMG pulses is separated from an adjacent pulse of the sequence of CPMG pulses by a wait time;

a single pulse of the sequence of CPMG pulses comprises a single echo train; and the single echo train comprises distinct echo times ($t_E$), the distinct echo times ($t_E$) comprising a first echo time ($t_{E1}$) temporally adjacent to a second echo time ($t_{E2}$) different than the first echo time ($t_{E1}$) and within the single echo train;

acquiring NMR logging measurements from the generating the sequence of CPMG pulses having the distinct echo times ($t_E$);

processing the NMR logging measurements acquired by an NMR logging tool to determine the NMR logging measurements were affected by lateral motion of the NMR logging tool; and in response to a determination that the NMR logging measurements were affected by the lateral motion of the NMR logging tool, modifying an operational parameter of a downhole assembly to account for the lateral motion in order to:

improve an accuracy of a determining at least one of a porosity or a total hydrogen content of a subsurface geological region; and drill a borehole via the downhole assembly based on the determining the at least one of the porosity or the total hydrogen content of the subsurface geological region.

8. The method of claim 7, wherein the distinct echo times ($t_E$) further comprise a third echo time ($t_{E3}$).

9. The method of claim 7, further comprising determining whether an oscillation amplitude of at least a portion of the NMR logging measurements acquired with the distinct echo times ($t_E$) exceeds a predetermined value as an indication that the NMR logging measurements were affected by the lateral motion of the NMR logging tool.

10. The method of claim 7, further comprising determining a difference between normalized NMR logging measurements acquired with the distinct echo times ($t_E$) and a result of an inversion with multi-exponential kernel functions applied to the normalized NMR logging measurements and using the difference as an indication that the NMR logging measurements were affected by the lateral motion of the NMR logging tool.

11. The method of claim 7, further comprising determining a difference between normalized NMR logging measurements acquired with the distinct echo times ($t_E$) and a result of an inversion with multi-stretched-exponential kernel functions or any other kernel functions applied to the normalized NMR logging measurements and using the difference as an indication that the NMR logging measurements were affected by the lateral motion of the NMR logging tool.

12. The method of claim 7, further comprising determining a difference between normalized NMR logging measurements acquired with the distinct echo times ($t_E$) or a result of an inversion with multi-stretched-exponential kernel functions, multi-exponential kernel functions, or any other kernel functions applied to the normalized NMR logging measurements acquired with the distinct echo times ($t_E$) with that from normalized NMR logging measurements acquired with a single echo spacing sequence and using the difference as an indication that the NMR logging measurements were affected by the lateral motion of the NMR logging tool.

13. The method of claim 7, further comprising determining whether to utilize the NMR logging measurements in generation of estimations of formation attributes of the subsurface geological region when a processing system determines that the NMR logging measurements were affected by the lateral motion of the NMR logging tool.

14. A tangible and non-transitory machine readable medium comprising instructions to cause a processing system to:

perform at least one Carr-Purcell-Meiboom-Gill (CPMG) scan via an NMR logging tool, the performing including generating a sequence of CPMG pulses, wherein:

each pulse of the sequence of CPMG pulses is separated from an adjacent pulse of the sequence of CPMG pulses by a single wait time;

a single pulse of the sequence of CPMG pulses comprises a single echo train; and the single echo train comprises distinct echo times ($t_E$), the distinct echo times ($t_E$) comprising a first echo time ($t_{E1}$) temporally adjacent to a second echo time ($t_{E2}$) different than the first echo time ($t_{E1}$) and within the single echo train;

acquire NMR logging measurements from the generating the sequence of CPMG pulses having the distinct echo times ($t_E$);

process the NMR logging measurements to determine the NMR logging measurements were affected by lateral motion of the NMR logging tool; and in response to a determination that the NMR logging measurements were affected by the lateral motion of the NMR logging tool, modify an operational parameter of a downhole assembly to account for the lateral motion in order to:

improve an accuracy of a determining at least one of a porosity or a total hydrogen content of a subsurface geological region; and drill a borehole via the downhole assembly based on the determining the at least one of the porosity or the total hydrogen content of the subsurface geological region.

15. The tangible and non-transitory machine readable medium of claim 14, wherein the distinct echo times ($t_E$) further comprise a third echo time ($t_{E3}$).

16. The tangible and non-transitory machine readable medium of claim 14, wherein the instructions further cause the processing system to determine whether an oscillation amplitude of at least a portion of the NMR logging measurements acquired with the distinct echo times ($t_E$) exceeds a predetermined value as an indication that the NMR logging measurements were affected by the lateral motion of the NMR logging tool.

17. The tangible and non-transitory machine readable medium of claim 14, wherein the instructions further cause the processing system to determine a difference between normalized NMR logging measurements acquired with the distinct echo times ($t_E$) and a result of an inversion with multi-exponential kernel functions applied to the normalized NMR logging measurements and use the difference as an indication that the NMR logging measurements were affected by the lateral motion of the NMR logging tool.

18. The tangible and non-transitory machine readable medium of claim 14, wherein the instructions further cause the processing system to determine a difference between normalized NMR logging measurements acquired with the distinct echo times ($t_E$) and a result of an inversion with multi-stretched-exponential kernel functions or any other kernel functions applied to the normalized NMR logging measurements and use the difference as an indication that the NMR logging measurements were affected by the lateral motion of the NMR logging tool.

19. The tangible and non-transitory machine readable medium of claim 14, wherein the instructions further cause the processing system to determine a difference between normalized NMR logging measurements acquired with the distinct echo times ($t_E$) or a result of an inversion with multi-stretched-exponential kernel functions, multi-exponential kernel functions, or any other kernel functions applied to the normalized NMR logging measurements acquired with the distinct echo times ($t_E$) and normalized NMR logging measurements acquired with a single echo spacing sequence and use the difference as an indication that the NMR logging measurements were affected by the lateral motion of the NMR logging tool.

20. The tangible and non-transitory machine readable medium of claim 14, wherein the instructions further cause the processing system to determine whether to utilize the NMR logging measurements in generation of estimations of formation attributes of the subsurface geological region, when the processing system determines that the NMR logging measurements were affected by the lateral motion of the NMR logging tool.

* * * * *